J. A. WILSON.
METHOD AND APPARATUS FOR REMOVING BLOOD FROM ANIMALS IN PROCESS OF SLAUGHTERING.
APPLICATION FILED MAR. 2, 1920.
1,428,672.
Patented Sept. 12, 1922.
3 SHEETS—SHEET 3.
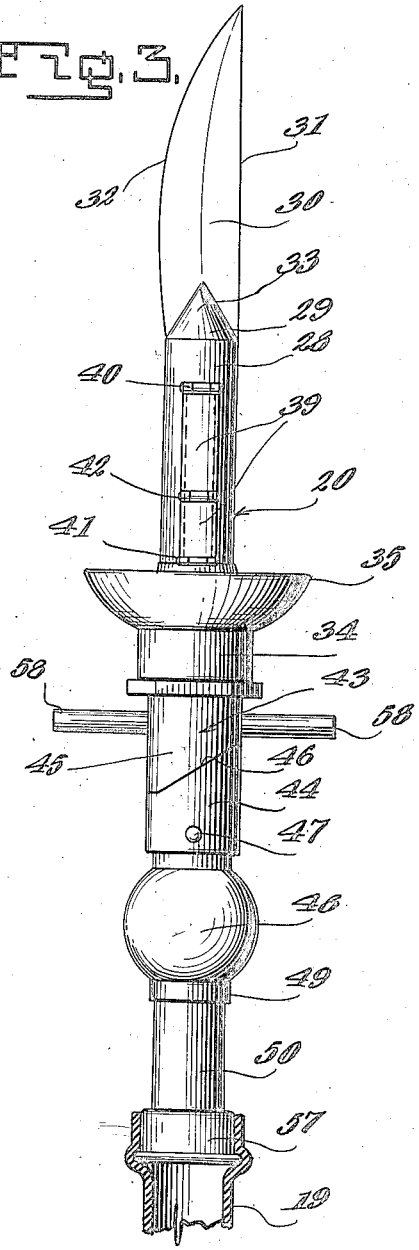
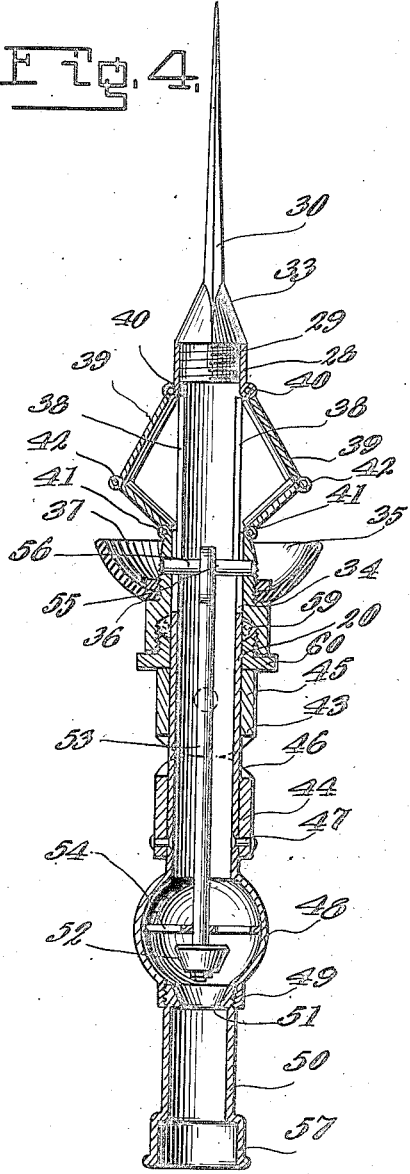
Inventor
John A. Wilson
By Lancaster & Allwine
Attorneys Patented Sept. 12, 1922.

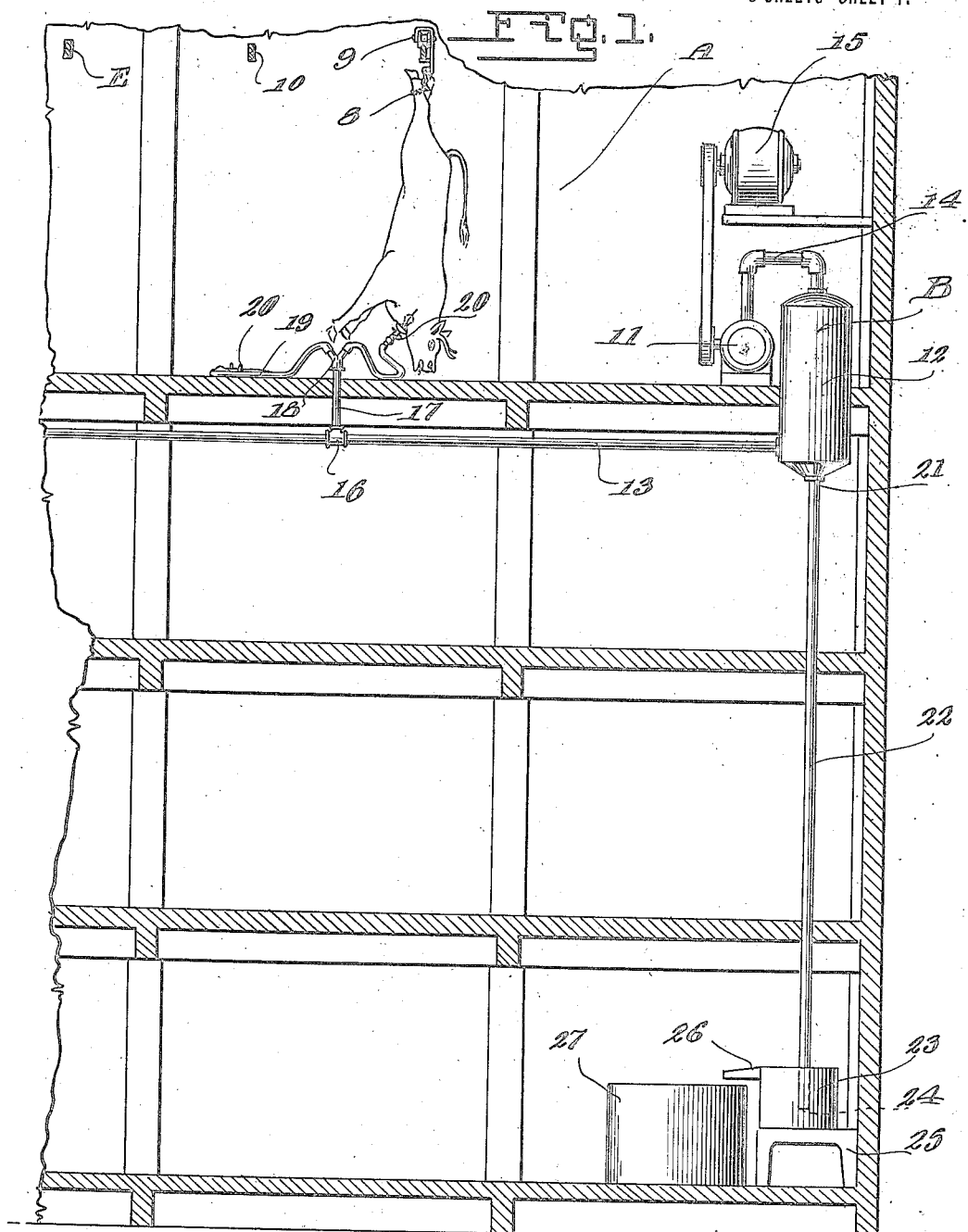

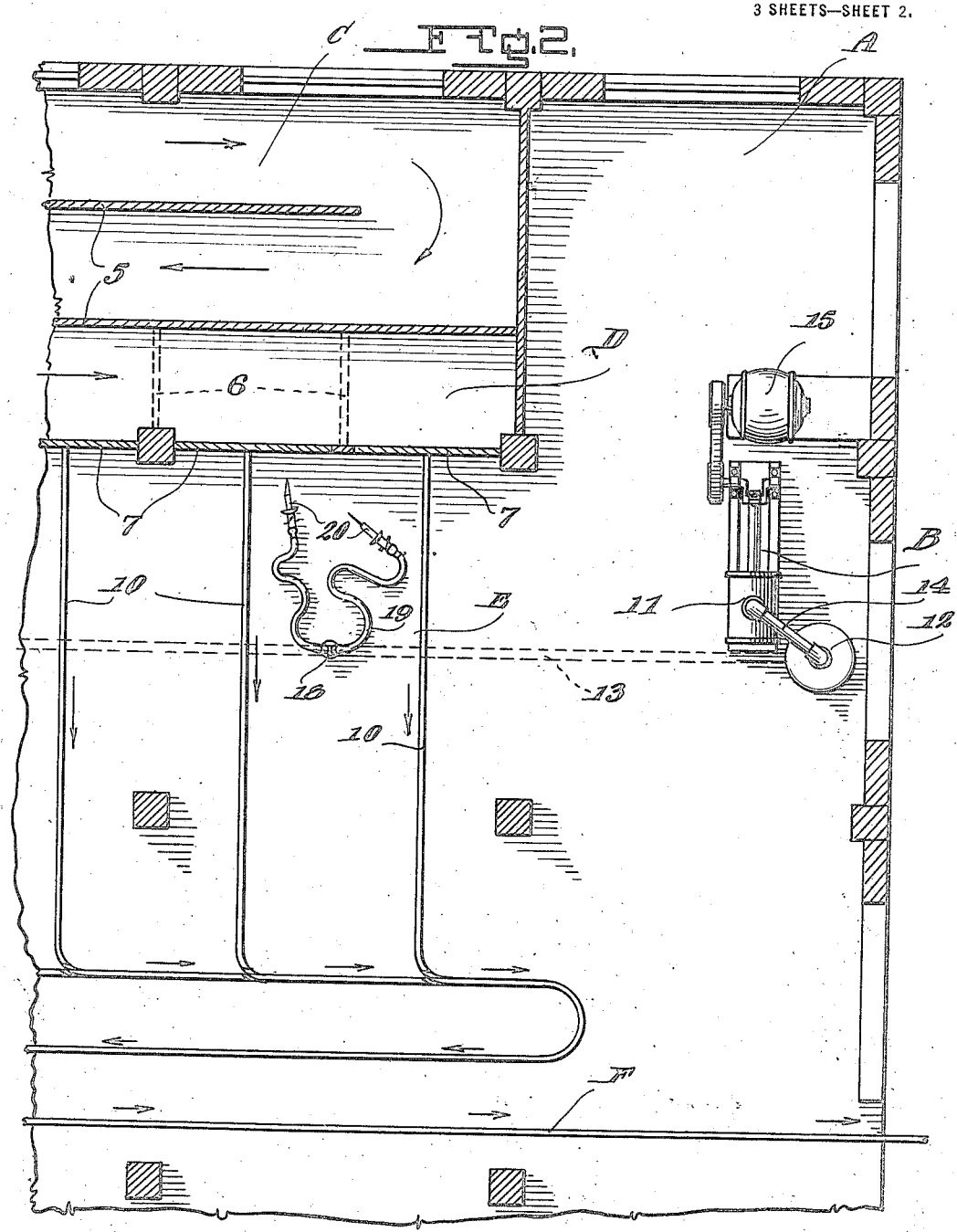

1,428,672

UNITED STATES PATENT OFFICE.

JOHN A. WILSON, OF KANSAS CITY, KANSAS, ASSIGNOR TO THE WILSON SLAUGHTERING DEVICE CO., OF KANSAS CITY, MISSOURI, A COMMON LAW TRUST.

METHOD AND APPARATUS FOR REMOVING BLOOD FROM ANIMALS IN PROCESS OF SLAUGHTERING.

Application filed March 2, 1920. Serial No. 362,684.

*To all whom it may concern:*

Be it known that I, JOHN A. WILSON, a citizen of the United States, residing at Kansas City, in the county of Wyandotte and State of Kansas, have invented certain new and useful Improvements in Methods and Apparatus for Removing Blood from Animals in Processes of Slaughtering, of which the following is a specification.

This invention relates to a method and apparatus for killing and removing the blood from animals in slaughter houses and the like, and the primary object of the invention is to provide an improved method and apparatus for killing the animals and for removing the blood therefrom by suction or vacuum means, and for conveying the blood to a desired tank to eliminate the inhuman and unsanitary method of having the blood flow on the floor and over the animals.

Another object of the invention is to provide an improved means for removing practically all of the blood from the arteries of the animals being killed by suction or vacuum means and thereby preventing clotting of the blood in the animal's carcass which eliminates the necessity of washing the carcass for the removal of the blood clots and the wasting of the blood, which is used for commercial purposes.

A further object of the invention is the provision of an improved means for withdrawing the blood from animals by vacuum means and for conveying the blood to a desired container, which will effectively eliminate all loss of the blood and keep the blood in a clean and sanitary condition for commercial purposes such as for the obtaining of certain serums therefrom or for use as fertilizer.

A further object of the invention is to provide an improved knife for severing the arteries of the animal being killed and for withdrawal and conveying of the blood from the arteries.

A further object of the invention is the provision of an improved knife for severing the arteries of an animal being killed having normally closed ports arranged therein adapted to be opened when the arteries are severed and having means for holding the wound open so as to permit the free flow of the blood into the ports.

A further object of the invention is the provision of a suction or vacuum system in a slaughtering house having a predetermined number of branch pipes connected thereto and arranged adjacent to the sticking rails, the branch pipes having the improved knives attached thereto for severing the arteries of the animals being killed and for withdrawing and catching the blood from the arteries for bringing the same to a desired place or receptacle.

A further object of the invention is the provision of an improved sticking knife embodying a hollow handle which is adapted to be attached to a vacuum or suction system, the handle having arranged therein a normally closed valve which is adapted to be opened when the animal's arteries have been severed by the knife.

A still further object of the invention is to provide an improved method and apparatus for the killing and withdrawing of blood from animals of the above character which is durable and efficient in use, one that is simple and easy to manufacture, and one which can be installed at a reasonable cost.

Other objects of the invention will appear in the following detailed description taken in connection with the drawing, forming a part of this specification, in which drawings:

Figure 1 is a fragmentary vertical section through a slaughtering house showing the improved device applied thereto.

Figure 2 is a fragmentary horizontal section through a slaughtering house showing the improved device applied thereto.

Figure 3 is an elevation of the improved sticking knife used in the improved device, and Figure 4 is a vertical longitudinal section through the improved sticking knife taken at right angles to Figure 3.

Referring to the drawings in detail wherein similar reference characters indicate corresponding parts throughout the several views, the letter A indicates a slaughter house of the ordinary or any preferred type, and B the improved apparatus for killing and withdrawing the blood from animals by vacuum means.

The slaughter house A includes the usual drive way C, the knocking pens D, the sticking rails E, and the washing rails F. The slaughter house A may be of any desired size or height and the drive way C as shown is arranged adjacent to one side thereof and includes the plurality of spaced parallel partitions 5, which are so arranged as to form a tortuous passage for the animals. A plurality of movable cross gates shown in dotted lines and indicated by the numeral 6, in Figure 2 of the drawings are provided for forming a plurality of pens D where the animals are stunned by a blow on the head. The knocking pens D are separated from the portion of the slaughter house containing the sticking rails E by movable gates 7, which are adapted to be raised after the animals are stunned, after which the animals are lifted and tied as at 8 to the carriers 9 slidably mounted on the sticking rails in the ordinary manner.

The sticking rails E consist of a plurality of equidistantly spaced parallel tracks 10 which extends outwardly from the knocking pens towards the washing rails F, which extend at right angles thereto. The sticking rails E are so connected with the washing rails as to permit the animal carriers 9 to be moved on to the wash rails F from the sticking rails E.

In the present method, now in vogue, the animals are suspended from the sticking rails E, and a common butcher's knife is thrust into the throat severing the large arteries that cross near the larynx, and the blood is permitted to flow from the wound over the animal and on to the floor. By permitting the blood to flow by gravity from the animal, a certain portion of the blood clots and stays in the arteries which makes a second process necessary. This second process consists in moving the animal to the washing rails where the clots of blood are washed away by water and the remaining blood forced from the arteries by working the animals front legs upon and down in a pumping motion.

The improved device B is so arranged as to absolutely eliminate the flow of blood on the floor and the loss of the blood by clotting and the hard work at the washing rail. The apparatus B includes an air pump 11 of the ordinary or any preferred style for exhausting the air in a tank 12, which has connected thereto adjacent its lower end the main pipe or pipes 13, which extend under the floor of that portion of the room in which the sticking rails E are arranged.

The air pump 11 is connected to the upper end of the tank 12 by a suitable pipe connection 14 and is driven by any preferred type of prime mover, which, as, shown, is an electric motor 15. The main suction pipe 13 has connected thereto by suitable T-joints 16, the vertical stand pipes 17, which extend through the floor between the sticking rails E. The stand pipes 17 have the upper ends thereof provided with a suitable Y-joint 18 which carries suitable flexible hose 19. The outer terminals of the flexible hose 19 have connected thereto the improved sticking knives 20 which will be hereinafter more fully described. While the stand pipe 17 as shown only has the two hose 19 connected thereto it is to be understood that any number of hose may be connected thereto as may be desirable or practical. The lower end of the tank 12 has secured thereto as at 21, the depending pipe 22, of a predetermined length, which extends into a sealed tank 23 and ends short of the bottom wall thereof as at 24. The sealed tank 23 may be supported upon a suitable stand 25 arranged at the lower floor of the slaughtering house. The upper end of the sealed tank 23 is provided with an outwardly extending mouth 26 through which the blood is adapted to flow in a suitable storage tank 27. The vacuum in the tank 12 caused by the pump 11 sucks the blood through the hose 19 into the stand pipe 17, through the main pipe 13 and into the lower end of the tank 12 where the same flows by gravity down the pipe 22 into the sealed tank 23, where the same overflows into the storage tank 27. The blood will not flow into the pump 11 owing to the fact that the force of gravity acting on the blood will pull the same down to the pipe 22. The blood in the pipe 22 will only rise to a certain level which has been found in actual practice to be about 25 feet. Theoretically water will rise in a vacuum to such a height where one square inch of its surface represents a weight equal to the pressure of air on an inch of outside surface. It follows that if blood weights 75 lbs. per cubic foot or .043 of a lb. per cubic inch, that the blood would rise only as many inches high in the stand pipe as .043 is contained into 15 which is 348 inches, or 29 feet. Thus, regardless of the force of suction produced by the air pump no blood will be sucked into the pump, but all of it will fall into the tank 23 at the bottom of the pipe 22. The improved sticking knife 20 clearly shown in Figures 3 and 4 of the drawings includes a hollow tubular stem 28 having its upper end internally threaded for the reception of the externally threaded head 29 formed on the lower end of the knife blade 30. The knife blade 30 may be of any desired length according to the size of the animals being slaughtered and in practice, a number of different knives will be provided so that the same can be attached to the stem 28 so as to permit a knife of the desired length to be readily attached to the stem. The knife blade 30 may be also of any desired configuration and as shown is provided with a straight edge 31 and a curved edge 32. The outer end of the head 29 is provided with a conical terminal 33 which permits the stem 28 to follow the knife blade 30 into the wound. The stem 28 has slidably mounted thereon intermediate its ends a collar 34 which has attached thereto a flexible rubber cup or hilt 35. The upper end of the collar 34 is reduced adjacent to its upper end to form the shoulder 36 for engaging the lower surface of the cup 35 and the same is held against displacement by a nut 37 which is threaded on the reduced terminal of the collar 34. The stem 28 directly below the outer end thereof is provided with a pair of diametrically opposed longitudinally extending slots 38 which form ports for permitting the entrance of blood into the stem. The slots 38 are normally closed by a pair of hinged leaves 39 arranged on the opposite sides of the stems which also form means for spreading the wound and for holding the knife in position in the animal's throat. The upper leaves 39 of each pair are formed relatively longer than the inner leaves and are pivotally connected as at 40 to the stem. The inner relatively short leaves 39 are pivotally connected as at 41 to the sliding collar 34, which forms means for operating the leaves to open or close the slots 38. The inner terminals of the leaves 39 of each pair are pivotally connected together as at 42. The sliding collar 34 is raised and lowered on the stem 28 by a cam 43, which includes a stationary section 44 and a sliding and rotatable section 45. The facing ends of the cam sections 43 and 44 are provided with cam surfaces 46. Thus it will be seen that when the slidable and rotatable cam section 45 is turned on the stem 28 the same will be thrown outwardly sliding the collar 32 on the stem and swinging the leaves 39 outwardly and opening the slots 28. The stationary cam section 44 is secured to the stem 28 in any preferred manner, such as by rivets 47. A substantially spherical valve casing 48 is formed on the stem 28 adjacent to its lower end and the inner end of the casing is provided with an internally threaded attaching collar 49, which engages the inner end of the lower detachable section 50 of the stem 28. The inner end of the detachable section 50 of the stem 28 has formed therein a valve seat 51 on which is adapted to fit the valve 52, which carries a longitudinally extending stem 53. A guide 54 is arranged in the valve casing 48 for the stem 53 and forms means for holding the stem in correct position so as to facilitate the seating of the valve 52. The outer end of the valve stem 53 is provided with an eye 55, which loosely receives the transversely extending rod 56 which has its terminals secured in the sliding collar 34. Thus it will be seen that when the collar 34 is slid on the stem 28 to open the leaves 39, the valve 52 will be lifted off of its seat. The lower end of the detachable section 50 of the stem 28 carries any suitable type of clamp 57 for permitting the same to be attached to the hose 19.

To facilitate the turning of the outer cam section 45 outwardly extending handles 58 are formed thereon, which may be of any preferred form or configuration. The lower end of the sliding collar 34 is provided with a suitable packing 59 and packing nut 60 and the inner end of the collar has its bore enlarged at this point for the reception of the nut. The packing 50 and nut 60 prevents escape of blood from the stem 28. In operation of the improved device, when an animal is brought from the knocking pens D and suspended from the sticking rails E, the sticker or butcher quickly forces the sticking knife 20 into the animal's throat at the desired point for severing the large arteries until the hilt or cup 35 comes into engagement with the outer surface of the wound. The handles 58 are then grasped by the sticker or butcher and the cam section 45 rotated which moves the leaves 39 constituting the spreader and retainer outwardly and lifts the valve 52 off of its seat. The leaves 39 hold the wound open and prevents the displacement of the knife therefrom. As soon as the valve 52 is lifted off of its seat, the blood will be drawn into the stem 28 through the slots 38 and conveyed to the tank 23 by the vacuum means which has heretofore been described.

In using the improved appliance for extracting blood from inoculated animals at a serum plant or the like, the hose 19 can be connected to an upright airtight tank which may be connected to an air pump. When the blood has been sucked into the tank to such a height that the same is liable to flow into the air pipe, the machine is stopped and the blood drawn from the bottom of the tank and the operation repeated.

From the foregoing description it can be seen that an improved method and apparatus for killing animals has been provided, by drawing the blood therefrom by a vacuum means, which is exceedingly simple and efficient in operation and which entirely eliminates the inhuman and unsanitary method now in vogue.

Changes in details may be made without departing from the spirit or scope of my invention; but,

I claim:

1. That step in the process of killing animals consisting of piercing the animal's throat and drawing the blood from the wound by a vacuum.

2. That step in the process of killing animals consisting of wounding the animal and drawing the blood from the wound by a vacuum.

3. That step in the process of killing animals consisting of severing the throat arteries and drawing the blood from the animal by suction.

4. That step in the process of killing animals consisting of severing the throat arteries, drawing the blood from the wound and conveying the blood to a storage tank.

5. That step in the method of slaughtering animals consisting of stunning the animals, suspending the animals from a support, severing the throat arteries, and drawing the blood from the animal by external means.

6. That step in the method of slaughtering stunned animals consisting of severing the throat by a knife having a hollow stem and drawing the blood through the stem by vacuum means.

7. That step in the process of slaughtering animals consisting of severing the throat by a knife having a hollow stem and drawing the blood through the stem by vacuum means and conveying the blood from the stem to a tank.

8. That step in the process of slaughtering animals consisting of wounding the animals, holding the wound open, and drawing the blood from the open wound by a vacuum.

9. A device for slaughtering animals comprising an air exhausted tank, a knife, a hollow stem formed on the knife, and means connecting the stem with the tank.

10. A device for slaughtering animals comprising a suction pump, a knife, a hollow stem formed on the knife, means connecting the stem with the pump, and expansible means carried by the stem for holding the knife in a wound and holding a wound open.

11. A device for slaughtering animals comprising a vacuum tank, means for exhausting air from the tank, a line pipe communicating with the tank, a knife, a hollow stem formed on the knife, means connecting the line pipe with the stem, a sealed tank arranged below the first mentioned tank, and a depending pipe carried by the first mentioned tank and extending into the sealed tank.

12. A device for slaughtering animals comprising a tank, a pump for exhausting the air from the tank, means for operating the pump, a line pipe connected to and communicating with the lower end of the tank, upstanding branch pipes connected to the line pipe, a knife, a hollow stem formed on the knife, flexible means connecting the hollow stem and the upstanding branch pipe, a depending pipe of a predetermined length connected to and communicating with the lower end of the pipe and a sealed tank for receiving the lower end of the pipe.

13. In an animal slaughtering device, a knife comprising a blade, a hollow stem formed on the blade having ports formed therein, and a cup carried by the stem arranged in rear of the ports.

14. In a slaughtering device, a knife comprising a blade, a stem, ports formed in the stem, and a flexible cup carried by the stem arranged in rear of the ports.

15. In an animal slaughtering device, a hollow stem, a knife blade carried by one end of the stem, the stem having oppositely disposed ports formed therein, a valve seat arranged in the stem, a valve arranged to normally seat on said seat, and means for lifting the valve off of the seat.

16. In an animal slaughtering device, a knife comprising a blade, a hollow stem carried by the blade, and collapsible means carried by the stem arranged to engage the wound to hold the knife against displacement.

17. In an animal slaughtering device, a knife comprising a blade, a hollow stem carried by the blade, and expansible means for engaging a wound to hold the knife against displacement therein and for holding the wound open.

18. In an animal slaughtering device, a knife comprising a blade, a hollow stem, and collapsible means carried by the stem for engaging a wound to hold the same in an opened position and the knife against displacement.

19. In an animal slaughtering device, a knife including a blade, a hollow stem having ports formed therein, pivoted leaves carried by the stem, and arranged to normally close said ports, and means for moving the leaves away from the ports and into engagement with the wound formed by the knife blade.

20. In a slaughtering device, a knife comprising a blade, a hollow stem, the stem having oppositely disposed slots formed therein, a valve arranged in the stem in rear of the slots, collapsible leaves arranged to normally close the slots, and means for operating the valve and for moving the leaves outwardly away from the slots.

21. In an animal slaughtering device, a knife comprising a blade, a hollow stem carried by the blade having oppositely disposed longitudinally extending slots formed therein, a slidable collar mounted on the stem, hinged leaves pivotally connected to the stem and to the collar, the leaves being arranged to normally close the slots, a valve arranged in the stem in rear of the slots, and a cam for operating the collar and for opening the valve.

22. In an animal slaughtering device, a knife comprising a blade, a hollow stem detachably carried by the blade, the stem having oppositely disposed slots formed therein, a collar slidably mounted on the stem, a cam slidably and rotatably mounted on the stem and arranged to engage the collar for sliding the same on the stem, hingedly connected leaves pivotally connected to the stem and to the collar and arranged to normally close the slots, a flexible cup carried by the collar, a normally closed valve arranged in the stem in rear of the slots, and means connecting the valve with the collar.

23. In an animal slaughtering device, a knife comprising a blade, a hollow stem carried by the blade having ports therein, means normally closing said ports, a valve in said stem, and means for simultaneously operating the means for closing the ports and the valve.

24. In an animal slaughtering device, a knife adapted to wound an animal, a hollow stem carried by the knife, ports in said stem, leaves for closing said ports and means for moving the leaves away from said ports and into engagement with the wound.

25. In an animal slaughtering apparatus, a knife having a hollow stem, a valve arranged in the stem, expansible means for engaging a wound made by the knife, means for simultaneously operating the valve and the expansible means, a receptacle, and vacuum means for sucking the blood from the stem to said receptacle.

JOHN A. WILSON.